F. E. SPERRY.
BEARING SURFACE.
APPLICATION FILED DEC. 1, 1915.
1,307,564.
Patented June 24, 1919.
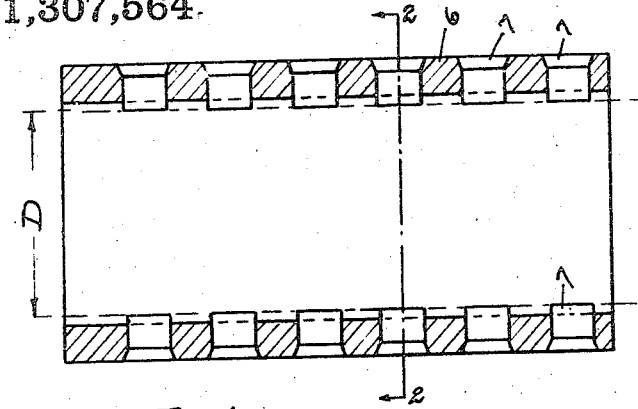
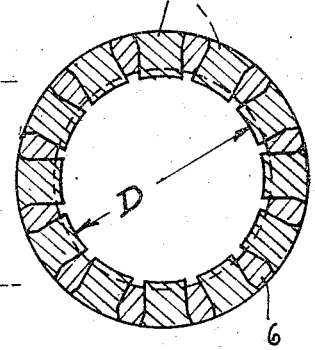
Fig. 1.
Fig. 2.
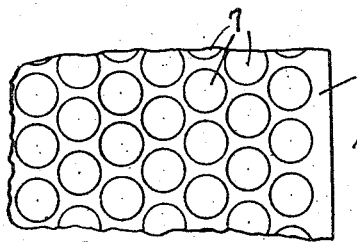
Fig. 3.
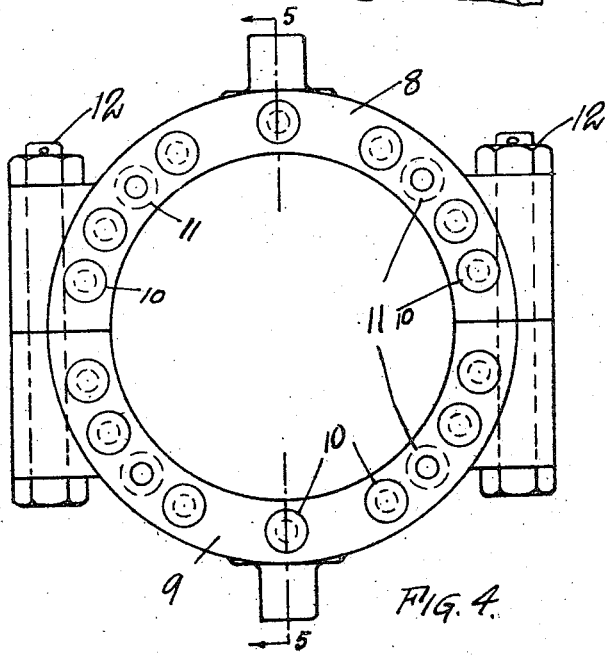
Fig. 4.
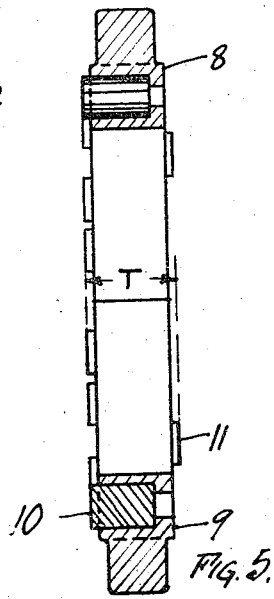
Fig. 5.
Inventor
F. Earl Sperry.
Witnesses
John B. Sperry.
Harvey _____

UNITED STATES PATENT OFFICE.

FRANK EARL SPERRY, OF BATAVIA, ILLINOIS.

BEARING-SURFACE.

1,307,564.            Specification of Letters Patent.      Patented June 24, 1919.

Application filed December 1, 1915. Serial No. 64,588.

*To all whom it may concern:*

Be it known that I, FRANK EARL SPERRY, citizen of the United States, residing at Batavia, in the county of Kane and State of Illinois, have invented certain new and useful Improvements in Bearing-Surfaces, of which the following is a specification.

This invention relates to bearing surfaces and has for its object a method of construction of a self lubricating peg bearing surface. Secondly, this invention relates to bearing surfaces and has for its object to provide for a non swelling bearing surface of a fibrous material containing a lubricant. Thirdly, this invention relates to bearing surfaces and has for its object to provide for a means of removing the heat of friction from the bearing. Fourth, this invention relates to bearing surfaces and has for its object a method of construction of a noiseless clutch releasing shoe for friction clutches.

My invention as related to a method of construction of a self lubricating peg bearing surface provides for a bearing surface upon the end grain of a fibrous material, which is filled with a lubricant which dissipates itself upon the bearing surface as required automatically, the utilization of the end grain of the fibrous material also adding quality and wearing ability to the bearing surface.

My invention as related to a non swelling bearing surface relies upon the fact that the fibrous material utilized in the construction of this bearing surface has an inappreciable elongation when subjected to dampness or immersed in water, consequently as the bearing is on the end grain of the fibrous material there is no seizure of the bearing possible even though a small allowance for a running fit is made.

By extensive experiments applicant has determined that in order to entirely remove liability of seizure due to swelling of the wooden pegs transversely it is necessary to limit the diameter of the pegs and the protrusion of same to the extent that the diameter of the peg shall always be less than 2 times the square root of the protrusion into the diameter of the shaft plus the protrusion. More concisely;

$$D < 2\sqrt{P(D_1 + P)}$$

where,

D is the diameter of the peg.
P is the protrusion of the pegs.
D is the diameter of the shaft.

This relation must be adhered to or difficulty due to seizure will be encountered.

My invention as related to a heat conducting means in a fibrous bearing surface relies upon the fact that I employ a metal retainer which readily conducts the heat of friction from the bearing proper and distributes it to other portions of the body which are in conjunction with the bearing which in most cases is adapted to radiate said heat of friction.

My invention as related to a noiseless clutch releasing shoe for friction clutches relies upon the utilization of a fibrous material containing a lubricant, and although considerable wear has been attained on the bearing no noise is produced due to the qualities of the fibrous material employed.

Heretofore the bearing of this type, namely, permanently lubricated bearings, have employed as a bearing surface, the grain of the fibrous material running parallel to the surface of the bearing which is readily understood to be the shortest lived as compared with a bearing surface utilizing the end grain of said fibrous material. The treated plugs described in the following description and shown in the preceding drawing are round in cross-section but need not be so made to perform the same functions.

The principal object and usefulness of this invention is to provide for a bearing which remains unchanged as to size in all conditions of humidity. It is practicable and desirable also to utilize permanently lubricated bearings where the same are submerged in water and whereas heretofore bearings have been employed which utilize the side grain of the fibrous material, and whereas the fibrous material employed increased in size laterally the result was in general that the bearing seized or else was made so loose that it served merely as a guide and not a support as originally intended. By the use of my invention it is practical and possible to make a close running fit on all bearings, whether submerged in water or in a dry warm location, without danger of seizing.

Heretofore bearings of fibrous material containing a lubricant have been solely made up of the fibrous material which has none of the heat conducting properties so desirable in bearings that are to be run at high speed thereby generating considerable heat of friction. If this heat of friction cannot be conducted away sufficiently fast, as in the case of the solid nonconducting fibrous material heretofore utilized, the bearing burns up and is destroyed. By the use of a bearing constructed according to these specifications it is therefore possible to run bearings at higher speeds without danger of burning up due to the heat conducting qualities of the metal retainer employed.

To overcome a source of annoyance in the case of rattling clutch releasing shoes for friction clutches, as is the case where a metal to metal bearing is used, my invention may be employed which allows for the fibrous material containing a lubricant to protrude from the metal retainer, said fibrous material being a noise reducer.

My invention as related to bearing surfaces may be constructed so that the pegs protrude through sufficiently to allow a receptacle for a solid lubricant to further assist in lubricating the bearing surface, and also serve as a protection against sand or grit entering the bearing.

Referring to the acompanying sheet of explanatory drawings:—Figure 1 is a longitudinal cross-section of the common type of bearing bushing. Fig. 2 is a cross-section at right angles to the axis of the bushing shown in Fig. 1. Fig. 3 is a development of the inner surface of the bushing shown in Fig. 1. Fig. 4 shows a plan view of the ordinary type of clutch releasing shoe for friction clutches. Fig. 5 shows a cross-section through the clutch releasing shoe shown in Fig. 4.

Referring to Figs. 1, 2, and 3 like figures and letters refer to the same parts. The pegs 7 are firmly held in the retainer 6 which is made of metal. The pegs 7 are impregnated with a lubricant and are allowed to protrude through the retainer sufficiently to insure a full bearing upon the pegs, also allowing a space that may be filled with solid lubricant. The holes in the retainer 6 that receives the pegs 7 are counter-sunk slightly as shown to facilitate entering the plugs 7 when they are pressed in and serves also as a means of securing said plugs from falling through the hole into the inside of the retainer, should the plugs for any reason shrink and become loose in the retainer. This particular type of bushing is usable in practice merely by pressing it into the body or shell that receives the bearing. The diameter of the shaft is shown at D′.

Referring to Figs. 4 and 5 like figures and letters refer to the same parts. The metal retainer in this case is split into two pieces such as 8 and 9 and are held together by means of the bolts and nuts 12. The set of pegs 10 shown in full lines are located on the pressure side of the shoe while the pegs 11 are used merely to prevent a metal to metal bearing. The pegs in the case of the clutch releasing shoe seat against a shoulder in the retainer so that they do not press flush with the retainer when the shoe is placed under pressure. A small hole completely through the retainer in line with each plug facilitates the removal of said plugs when same become worn down and are in need of replacement. "T" represents the width of the riding groove for the clutch releasing shoe.

Having now described my invention, what I claim as new and desire to secure by Letters Patent is:—

1. The method of constructing a self lubricating, non-swelling bearing surface, which consists of inserting pegs of fibrous material impregnated with a lubricant, in a metal retainer, means for securing said pegs in said retainer by allowing said pegs to expand at both ends with freedom.

2. The method of construction of a self lubricating, non-swelling bearing surface, which consists of inserting pegs of fibrous material impregnated with a lubricant in a metal retainer, said pegs projecting to form a bearing surface beyond said retainer, and means for securing said pegs in said retainer by allowing said pegs to expand at both ends.

In testimony whereof I have signed my name to this specification in the presence of two subscribing witnesses.

F. EARL SPERRY.

Witnesses:
JOHN B. SPERRY,
HARVEY GUNSUL.